No. 714,631. Patented Nov. 25, 1902.
E. M. BARNES.
TRUING DEVICE FOR TRIPLE CYLINDERS OF AIR BRAKES.
(Application filed July 23, 1902.)
(No Model.)
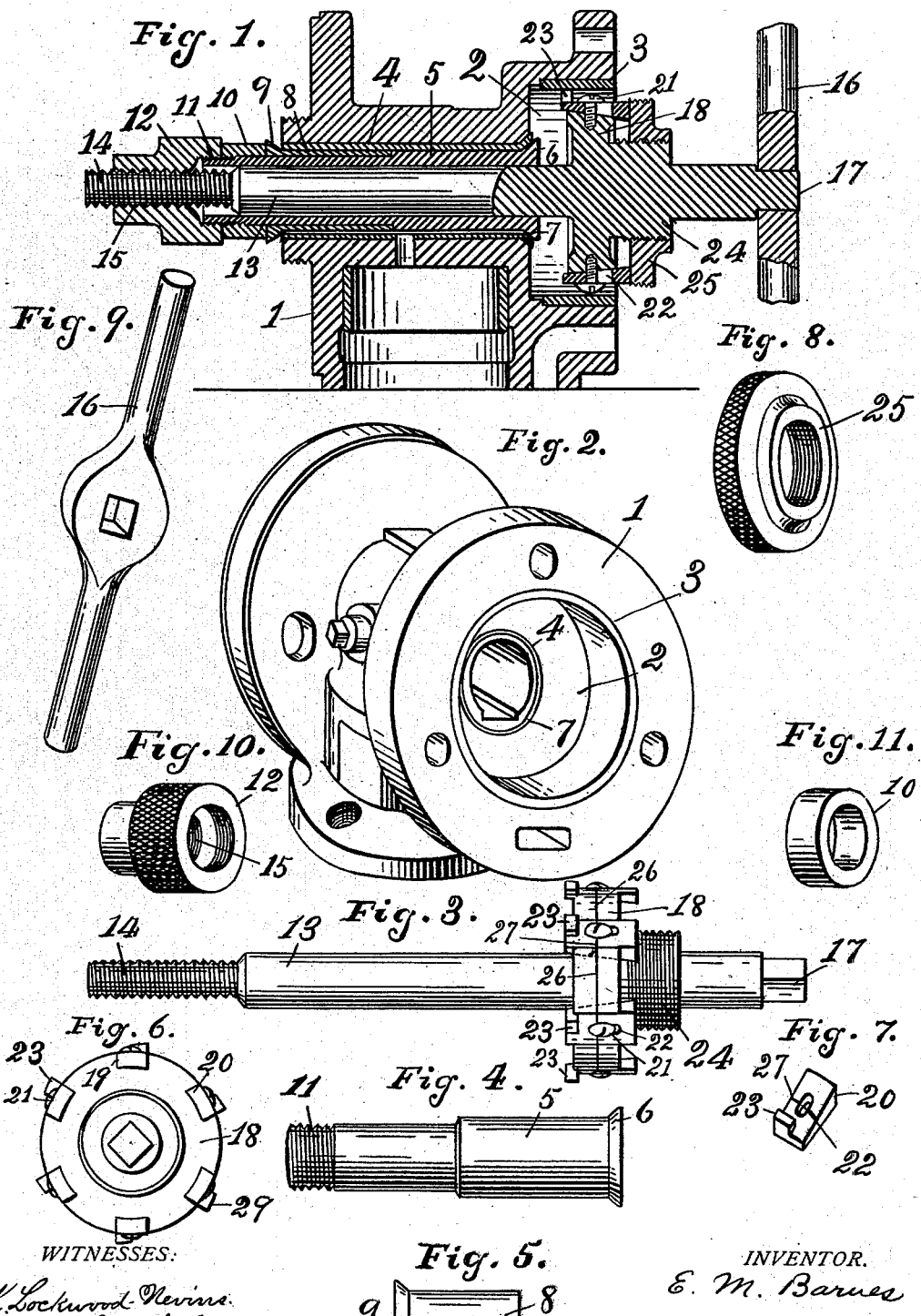
WITNESSES:
K. Lockwood Nevins.
Bessie Gofinkel
INVENTOR.
E. M. Barnes
BY Francis M. Wright.
ATTORNEY.
THE NORRIS PETERS CO., PHOTO-LITHO., WASHINGTON, D. C.

UNITED STATES PATENT OFFICE.

EDWIN M. BARNES, OF SACRAMENTO, CALIFORNIA, ASSIGNOR OF ONE-HALF TO ROBERT GRAHAM AND EDGAR R. M. PIERCE, OF SACRAMENTO, CALIFORNIA.

TRUING DEVICE FOR TRIPLE CYLINDERS OF AIR-BRAKES.

SPECIFICATION forming part of Letters Patent No. 714,631, dated November 25, 1902.

Application filed July 23, 1902. Serial No. 116,750. (No model.)

*To all whom it may concern:*

Be it known that I, EDWIN M. BARNES, a citizen of the United States, residing at Sacramento, in the county of Sacramento and State of California, have invented certain new and useful Improvements in Truing Devices for Triple Cylinders of Air-Brakes, of which the following is a specification.

My invention relates to a device for truing triple cylinders of air-brakes, the object of my invention being to provide a device of this character which shall be comparatively simple and inexpensive in construction and which can be operated by hand, thus dispensing with power for that purpose.

The object of my invention is to provide a simple means by which the bushing can be absolutely trued without the necessity of sending it to a power-shop or using expensive machinery for that purpose and which will also enable this operation to be performed in a very short time and with absolute correctness.

An important advantage of my truing device arises from the fact that the operation thereof is not attended by any jar, which is unavoidable in using an emery-wheel for grinding the bushing, as is commonly the practice, since these emery-wheels must be run at a high speed, and hence a jar cannot be avoided. Such jar causes imperfections in the truing of the bushing. The advantage of my improvement is that the bushing so trued is really more accurate than when originally turned out from the factory if ground by an emery-wheel.

In the accompanying drawings, Figure 1 is a longitudinal section of a triple-valve casing and the improved truing device in position therein. Fig. 2 is a perspective view of the casing, the truing device being removed. Fig. 3 is a side view of the cutter-stem and the cutters thereof. Fig. 4 is a side view of the bearing for said stem. Fig. 5 is a side view of the end collar for said bearing. Fig. 6 is an end view of the stem. Fig. 7 is a perspective view of one of the cutters detached. Fig. 8 is a perspective view of the equalizing and adjusting nut for the cutters. Fig. 9 is a perspective view of the handle of the device. Fig. 10 is a perspective view of the lock-nut, and Fig. 11 is a perspective view of the spacing-collar.

Referring to the drawings, 1 represents the casing of the triple valve of an air-brake, having the cylinder 2, provided with a bushing 3. In this bushing works the piston, (not here shown,) and it is this bushing which it is the object of my invention to accurately true. For this purpose I insert in the seat 4 of the slide-valve a tubular bearing 5, having at one end a beveled collar or flange 6, which fits snugly in the beveled end 7 of the slide-valve seat. The other end of said bearing receives a collar 8, which is also provided with a flange 9, which abuts against the outer end of the slide-valve seat. These beveled ends serve the purpose of accurately centering the bearing in the slide-valve seat. Upon the outer end of said bearing is then passed a collar 10, of which a number will be provided of various lengths, for the purpose of adjusting the device to the length of the slide-valve seat, these seats varying in length. Upon the outer threaded end 11 of said bearing is then screwed a lock-nut 12, which is screwed up very tight to firmly bind the bearing 5 within the slide-valve seat and hold the same stationary therein. Within the bearing 5 is now passed the stem or shaft 13 of the cutting device. The outer end thereof has formed thereon a thread 14 of very slow pitch, which thread engages an internal thread 15, formed in the end of the lock-nut. Said cutter is turned by hand by means of a suitable double crank or handle 16, secured upon the squared end 17 of the cutter-stem, and the rotation of said stem by the engagement of its threaded end with the thread 15 of the lock-nut causes the cutter to be slowly fed into the bushing. Said stem 13 has formed integral thereon a cutter-holder 18 of a general cylindrical shape and of somewhat smaller diameter than the bushing to be trued, said cutter-holder having formed in its periphery a suitable number, as six, of recesses 19. In each recess is held a cutter 20, said cutter being secured therein by means of a screw 21, passed through a slot 22 in the cutter and screwed into a screw-hole in the cutter-holder. The cutter-body is wedge-shaped in general form and is placed in the recess in the cutter-holder, so that its smaller or tapering end is directed toward the bushing. The bottom of the recess in the cutter-holder also slopes upwardly or radially outward toward the bushing, and the result is that when the cutter is moved toward the bushing the effect will be to at the same time move it radially outward.

Each cutter has formed on one corner thereof a bit 23, which engages the bushing in the revolution of the cutter-holder, and these bits perform the function of cutting out the bushing to the required diameter and truing the same as the cutters are revolved.

For the purpose of very accurately adjusting all the cutters to precisely the same distance from the central axis of the cutting device there is also provided on the stem 13 and integral therewith a threaded enlargement 24, upon which is screwed an equalizing and adjusting nut 25, having a broad inner face arranged to engage simultaneously the rear ends of all the cutters. The thread of this nut 25 is of a very slow pitch. All the screws which secure the cutter in place having been loosened and the nut 25 being screwed inward, the engagement of the front face of said adjusting-nut with the rear ends of the cutters will advance all of said cutters inward to precisely the same extent, thereby also by reason of the wedge shape of the cutters and the slope of the recess moving the same radially outward to a proportional though much smaller extent. When all of the cutters have been accurately adjusted to the required diameter at which it is desired to cut the bushing, the set-screws 21 are tightened and the cutting device is rotated on its stem by hand, cutting the bushing and truing the same.

In order to more accurately adjust the cutters for the precise diameter to which it is desired to cut the bushing, there is formed upon the periphery of the cutter-holder between the recesses 19 a circular line 26, and each of the cutters has also formed thereon a transverse line 27. When the transverse lines 27 aline with the circular line 26, the bits 28 are at such distance from the center as to cut to what is known as the "standard" size of bushing. When it is desired to cut the bushing to a less diameter than the standard size, the cutters are moved inward and when to a greater diameter than the standard size they are moved outward, the extent of such movement being readily determined either by calculation or by experience.

The advantage of having a considerable number of cutters instead of one or two only is that there is thereby avoided vibration of the device which might otherwise occur, due to the strain upon one of the cutters, while the other was not undergoing any strain or doing any work. By providing a sufficient number of these cutters it is obtained that the strain will be distributed evenly around the whole device to prevent vibration.

I claim—

1. In a device for truing cylinders of triple valves of air-brakes, the combination of a removable bearing arranged to fit within the slide-valve seat, means for fixedly clamping and centering said bearing in said seat, a device attached to said bearing having an internal thread, a cutter-stem having a threaded end working in said internal thread, a cutter-holder carried by said stem, and cutters carried by said holder, substantially as described.

2. In a device for truing cylinders of triple valves of air-brakes, the combination of a removable bearing arranged to fit within the slide-valve seat, means for fixedly clamping and centering said bearing in said seat, a device attached to said bearing having an internal thread, a cutter-stem having a threaded end working in said internal thread, a cutter-holder carried by said stem, cutters carried by said holder and an equalizing and adjusting nut for equally adjusting all of said cutters, substantially as described.

3. In a device for truing cylinders of triple valves of air-brakes, the combination of a removable bearing arranged to fit within the slide-valve seat, means for fixedly clamping and centering said bearing in said seat, a device attached to said bearing having an internal thread, a cutter-stem having a threaded end working in said internal thread, a cutter-holder carried by said stem, said cutter-holder having recesses sloping outwardly toward the bushing and wedge-shaped cutters carried by said holder, and means for adjusting said cutters longitudinally, substantially as described.

In witness whereof I have hereunto set my hand in the presence of two subscribing witnesses.

EDWIN M. BARNES.

Witnesses:
 ROB. GRAHAM,
 EDGAR R. M. PIERCE.